J. MILLER, Jr.

Improvement in Nut-Locks.

No. 130,736. Patented Aug. 20, 1872.

Witnesses.
Jas. L. Ewin
Walter Allen

Inventor.
John Miller Jr.
By Knight Bro
Attorneys

UNITED STATES PATENT OFFICE.

JOHN MILLER, JR., OF RICHMOND, INDIANA.

IMPROVEMENT IN NUT-LOCKS.

Specification forming part of Letters Patent No. 130,736, dated August 20, 1872.

Specification describing certain Improvements in Nut-Locks, invented by JOHN MILLER, Jr., of Richmond, in the county of Wayne and State of Indiana.

Nature and Objects of the Invention.

My invention consists in the employment of a spring-washer, preferably made of steel, inserted between the nut and fish-plate, which washer is of a semi-elliptical or curved form around the bolt-hole to allow the washer to elongate when the nut is screwed upon it; the said washer being also so curved that one or more of its sides project above the under side of the nut, when the latter is screwed down, to prevent the nut from working loose by the resistance of the curved side or sides of the spring-washer.

Figure 1:
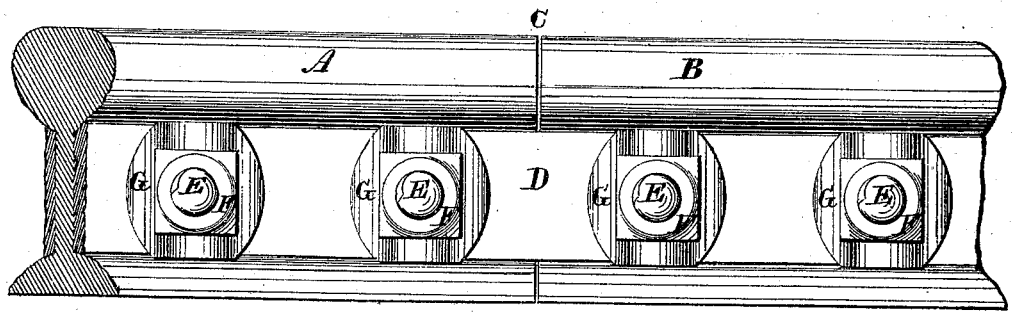
Figure 1 is an elevation of a section of railway-rail with splice-joint and my invention applied.
Figure 2:
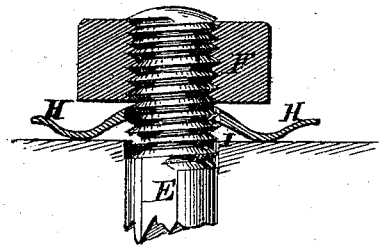
Fig. 2 is a section of the nut and locking-washer upon the end of the bolt, showing the position of parts before the nut is screwed down.
Figure 3:
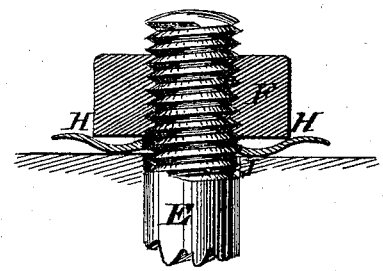
Fig. 3 is a cross-section of the nut and washer with the nut screwed down.
Figure 4:
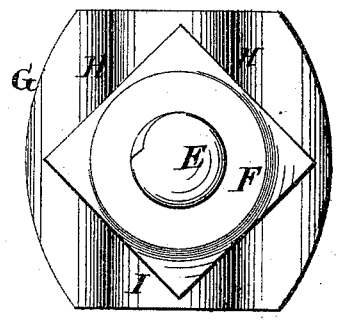
Fig. 4 is an elevation representing the position of the corners of the nut on curved sides of washer while being screwed down.

General Description.

A and B represent two railway-rails, and C the joint between them. D is a fish-plate on one side of the rails, covering the joint C, there being, if deemed necessary, a corresponding one on the other side. E is a headed bolt, passing through both fish-plates and the rails; and F is a nut, screwed upon that end of the bolt E which is not headed. G is a spring-washer, which is preferably made of steel, and having one or more of its outer edges so curved, as seen at H H, as to project above the under side of the nut F when the latter is screwed down upon the spring-washer G.

In the operation of screwing the nut F down upon the spring-washer G the curved side or sides H H of the spring-washer G are depressed by the passage of the corner of the nut and spring back, when the lower edge of the face of the nut rests entirely upon the curve H of the washer; and as the same force has to be exerted, and the same depression of the curved side or sides of the washer produced, in unscrewing the nut, the latter is effectually prevented from working loose.

In order to render the bearing of the nut elastic, which is important, and also to compensate for any elongation or shortening of the bolts by their expansion or contraction from heat and cold, I make the central part I of the washer of a curved and, preferably, of a semi-elliptic form, in section, which will be elongated or straightened out by the pressure of the under side of the nut F upon it as the former is tightly screwed down upon the washer, and yields with any elongation or shortening of the bolt or other parts from their expansion or contraction.

It is obvious that it is not requisite to keep the nut from turning that the central part of the washer around the bolt-hole should be made of a curved or semi-elliptical form, as the curving of the side or sides of the spring-washer at H H, as described, will, when the nut is screwed down, effectually produce that result.

The spring-washer is prevented from turning by squaring that portion or portions of it bearing against the under side of the rail or against its foot, or squaring both parts.

Claim.

I claim as new and of my invention—

The spring-washer G provided with curves H H near one or more of its outer edges, and having the curve I at its center, in combination with the nut F and bolt E, as described.

JOHN MILLER, JR.

Witnesses:
GEO. JEWELL,
W. E. BELL.